United States Patent
Fujita et al.

(10) Patent No.: US 11,498,154 B2
(45) Date of Patent: Nov. 15, 2022

(54) LINEAR FRICTION-JOINING DEVICE AND LINEAR FRICTION-JOINING METHOD

(71) Applicant: IHI Corporation, Koto-ku (JP)

(72) Inventors: Takafumi Fujita, Tokyo (JP); Yasushi Dodo, Tokyo (JP); Kazunori Tokue, Tokyo (JP)

(73) Assignee: IHI Corporation, Koto-ku (JP)

( * ) Notice: Subject to any disclaimer, the term of this patent is extended or adjusted under 35 U.S.C. 154(b) by 437 days.

(21) Appl. No.: 16/484,279

(22) PCT Filed: Feb. 15, 2018

(86) PCT No.: PCT/JP2018/005319
§ 371 (c)(1),
(2) Date: Aug. 7, 2019

(87) PCT Pub. No.: WO2018/155307
PCT Pub. Date: Aug. 30, 2018

(65) Prior Publication Data
US 2020/0001392 A1     Jan. 2, 2020

(30) Foreign Application Priority Data

Feb. 21, 2017    (JP) .............................. JP2017-029646

(51) Int. Cl.
    *B23K 20/00*       (2006.01)
    *B23K 20/12*       (2006.01)

(52) U.S. Cl.
CPC ........ *B23K 20/123* (2013.01); *B23K 20/1205* (2013.01); *B23K 20/1255* (2013.01)

(58) Field of Classification Search
CPC .................................................... B23K 20/12
See application file for complete search history.

(56) References Cited

U.S. PATENT DOCUMENTS 3,623,742 A * 11/1971 Funk ................... B23B 31/1207
                                       279/65
3,772,765 A * 11/1973 Ditto ...................... B23K 20/12
                                       228/113

(Continued)

FOREIGN PATENT DOCUMENTS

CN         101020275 A     8/2007
CN         101559532 A    10/2009

(Continued)

OTHER PUBLICATIONS

International Search Report dated Mar. 27, 2018 in PCT/JP2018/005319 filed on Feb. 15, 2018.

*Primary Examiner* — Erin B Saad
(74) *Attorney, Agent, or Firm* — Oblon, McClelland, Maier & Neustadt, L.L.P.

(57) ABSTRACT

The present disclosure provides a linear friction joining device which includes: a pressing device for pressing a second member onto a first member in a pressing direction; a vibrator for relatively vibrating the first member and the second member; a controller which is configured to bring the second member into contact with the first member by a position control, which depends on a measurement result of position sensors, to change the position control to a load control, which depends on a measurement result of load sensors, and to increase a pressing load toward a joining load; and a joining load reaching time adjuster which is configured to adjust a length of a joining load reaching time which is between the time when the position control is changed to the load control and the time when the pressing load reaches the joining load.

6 Claims, 5 Drawing Sheets

(56) References Cited

U.S. PATENT DOCUMENTS

| | | |
|---|---|---|
| 7,624,907 B2 | 12/2009 | Alessi et al. |
| 7,882,996 B2 | 2/2011 | Alessi et al. |
| 2008/0308611 A1 | 12/2008 | Alessi et al. |
| 2009/0321497 A1 | 12/2009 | Alessi et al. |
| 2018/0354064 A1* | 12/2018 | Fukuda ................ B23K 20/123 |

FOREIGN PATENT DOCUMENTS

| | | |
|---|---|---|
| DE | 10 2009 060 138 A1 | 6/2011 |
| JP | 60-87986 A | 5/1985 |
| JP | 2009-277962 A | 11/2009 |
| JP | 2011-110574 A | 6/2011 |
| JP | 2015-164738 A | 9/2015 |
| RU | 2 385 788 C2 | 4/2010 |

* cited by examiner

LINEAR FRICTION-JOINING DEVICE AND LINEAR FRICTION-JOINING METHOD

TECHNICAL FIELD

The present disclosure is related to a linear friction-joining device and a linear friction-joining method.

Priority is claimed on Japanese Patent Application No. 2017-29646, filed on Feb. 21, 2017, the content of which is incorporated herein by reference.

BACKGROUND ART

In recent years, in a field of an aero engine, an integral impeller (brisk) is used as a rotor of a compressor or a turbine so as to improve mechanical strength and lightweight. The integral impeller has an integral structure of a disk and a blade. The integral impeller is usually formed by cutting a material out. However, such as generation of a large number of fragments, use efficiency of the material is poor. It is desired to improve the use efficiency of the material by integrating the disk and the blade separately formed, by linear friction welding (LFW). As a linear friction-joining device which performs the linear friction welding, for example, a friction-joining device described in Patent Document 1 is known.

CITATION LIST

Patent Literature

[Patent Document 1] Japanese Unexamined Patent Application, First Publication No. 2015-164738

SUMMARY OF INVENTION

Technical Problem

The linear friction-joining device joins workpieces A (a first member) and B (a second member) by pressing the workpiece B with a certain load (a joining load) while vibrating the workpiece A. Before a joining sequence of the linear friction-joining, the workpieces A and B are separated from each other, and from a position away from the workpiece A, the workpiece B mounted on a jig approaches and collides by position control of a hydraulic cylinder (a pressing device). After this collision, when a pressing load exceeds a predetermined threshold value, the pressing load is changed to load control and immediately reaches the joining load, and joining is performed.

The workpiece B is mounted on a heavy jig. In some cases, after the collision, until the position control is changed to the load control and the load control reaches the joining load, an inertial force (including an inertial force of the jig) acting on the workpiece B is applied, so that the load control overshoots the joining load by a sharp increase of the pressing load. When this exaggerated overshoot load occurs, there is a possibility that the workpiece is damaged. In addition, when a surge pressure is generated by a so-called water hammer phenomenon in which a flowing fluid abruptly stops due to a sudden stop of a cylinder displacement at the time of the collision and a pressure in a path rapidly increases due to an inertial force of the fluid, there is a possibility that a servo valve or the like which is a precision instrument breaks down.

In view of the circumstances described above, an object of the present disclosure is to provide a linear friction-joining device and a linear friction-joining method capable of preventing overshooting of a pressing load and occurrence of surge pressure due to an inertial force when workpieces collide with each other.

Solution to Problem

According to a first aspect of the present disclosure, there is provided a linear friction-joining device which includes: a pressing device for pressing a second member onto a first member in a pressing direction; a vibrator for relatively vibrating the first member and the second member; a position sensor which is configured to measure a displacement amount of the second member in the pressing direction; a load sensor which is configured to measure a pressing load of the second member pressed onto the first member; a controller which is configured to bring the first member into contact with the second member by a position control, which depends on a measurement result of the position sensor, to change the position control to a load control, which depends on a measurement result of the load sensor, and to increase the pressing load toward a joining load; and a joining load reaching time adjuster which is configured to adjust a length of a joining load reaching time which is between the time when the position control is changed to the load control until the time when the pressing load reaches the joining load.

According to a second aspect of the present disclosure, in the first aspect, the joining load reaching time adjuster is the controller which is configured to adjust the length of the joining load reaching time according to magnitude of an inertial force acting on the second member during the position control.

According to a third aspect of the present disclosure, in the first or second aspect, the joining load reaching time adjuster is the controller which is configured to set a target load, which is lower than the joining load, before reaching the joining load and to gradually increase the pressing load toward the joining load, during the load control.

According to a fourth aspect of the present disclosure, in the first or second aspect, the joining load reaching time adjuster is the controller which is configured to gradually increase an increasing speed per unit time of the pressing load during the load control.

According to a fifth aspect of the present disclosure, in the first aspect, the pressing device includes a jig on which the second member is loaded and a cylinder device which moves the jig, and the joining load reaching time adjuster is a spring member interposed between the jig and the cylinder device.

According to a sixth aspect of the present disclosure, there is provided a linear friction-joining method which includes steps of: pressing a second member onto a first member in a pressing direction; relatively vibrating the first member and the second member; measuring a displacement amount of the second member in the pressing direction; measuring a pressing load of the second member pressed onto the first member; bringing the second member into contact with the first member by position control, which depends on a displacement amount, changing the position control to a load control, which depends on a measurement result of the pressing load, and increasing the pressing load toward a joining load; and adjusting a length of a joining load reaching time which is between the time when the position control is changed to the load control and the time when the pressing load reaches the joining load.

Advantageous Effects of Invention

According to the present disclosure, in the linear friction-joining device, the length of the joining load reaching time which is between the time when the position control, which depends on the displacement amount of the second member in the pressing direction, is changed to the load control, which depends on the pressing load of pressing the second member onto the first member, and the time when the pressing load reaches the joining load is adjusted. For this reason, it is possible to prevent a sharp increase of the pressing load by preventing the inertial force acting on the second member from being overlapped with the increase of the pressing load caused by the control when the second member collides the first member.

Therefore, according to the present disclosure, in a linear friction-joining device, it is possible to prevent overshooting of a pressing load and occurrence of surge pressure due to an inertial force when workpieces collide with each other.

DESCRIPTION OF EMBODIMENTS

Hereinafter, embodiments of the present disclosure will be described with reference to the drawings.

Figure 1:
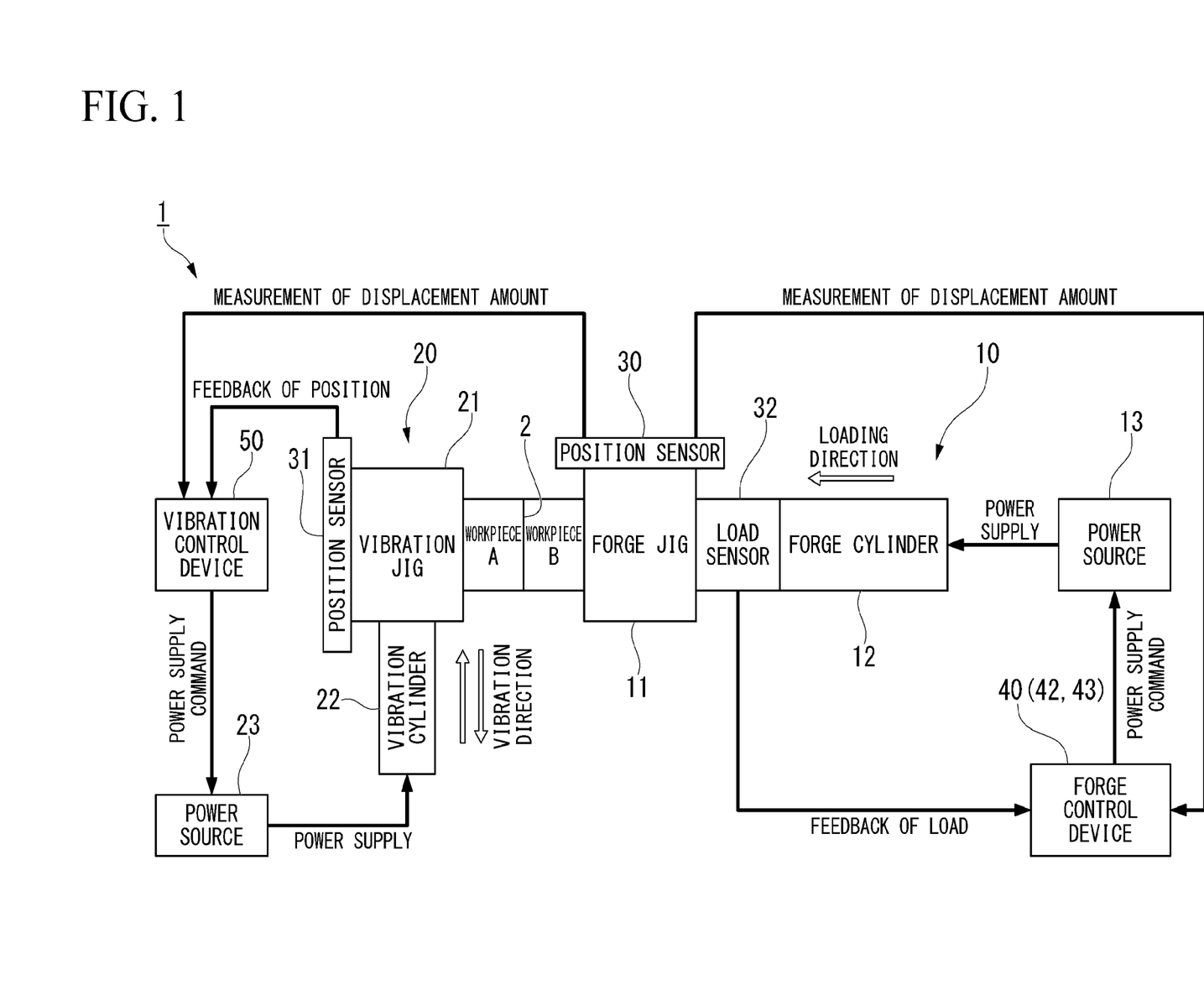
FIG. 1 is a block diagram showing a configuration of a linear friction-joining device according to an embodiment and a modification example of the present disclosure.

FIG. 1 is a block diagram showing a configuration of a linear friction-joining device 1 according to the embodiment of the present disclosure.

The linear friction-joining device 1 is a device for joining a workpiece A (a first member) and a workpiece B (a second member), and includes a forge device 10 (a pressing device), a vibrator 20, position sensors 30 and 31, a load sensor 32, a forge controller 40 (a controller), and a vibration controller 50.

The forge device 10 includes a forge jig 11, a forge cylinder 12, and a power source 13 and presses the workpiece B onto the workpiece A. The forge jig 11 includes a chuck mechanism for holding the workpiece B, and is configured to be movable in a direction of approaching or separating from the workpiece A. The forge cylinder 12 is a hydraulic cylinder or the like, and applies a load to the forge jig 11. This loading direction is a direction perpendicular to a bonding surface 2 of the workpiece A and the workpiece B, and is a pressing direction of the workpiece B.

Under control of the forge controller 40, the power source 13 supplies a power (for example, hydraulic fluid) to the forge cylinder 12. Based on a measurement result of the position sensor 30 and the load sensor 32, the forge controller 40 outputs a power supply command to the power source 13. The position sensor 30 measures a position of the forge cylinder 12, that is, a displacement amount of the workpiece B in a pressing direction. The load sensor 32 is interposed between the forge jig 11 and the forge cylinder 12 and measures a pressing load of the workpiece B.

Figure 5:
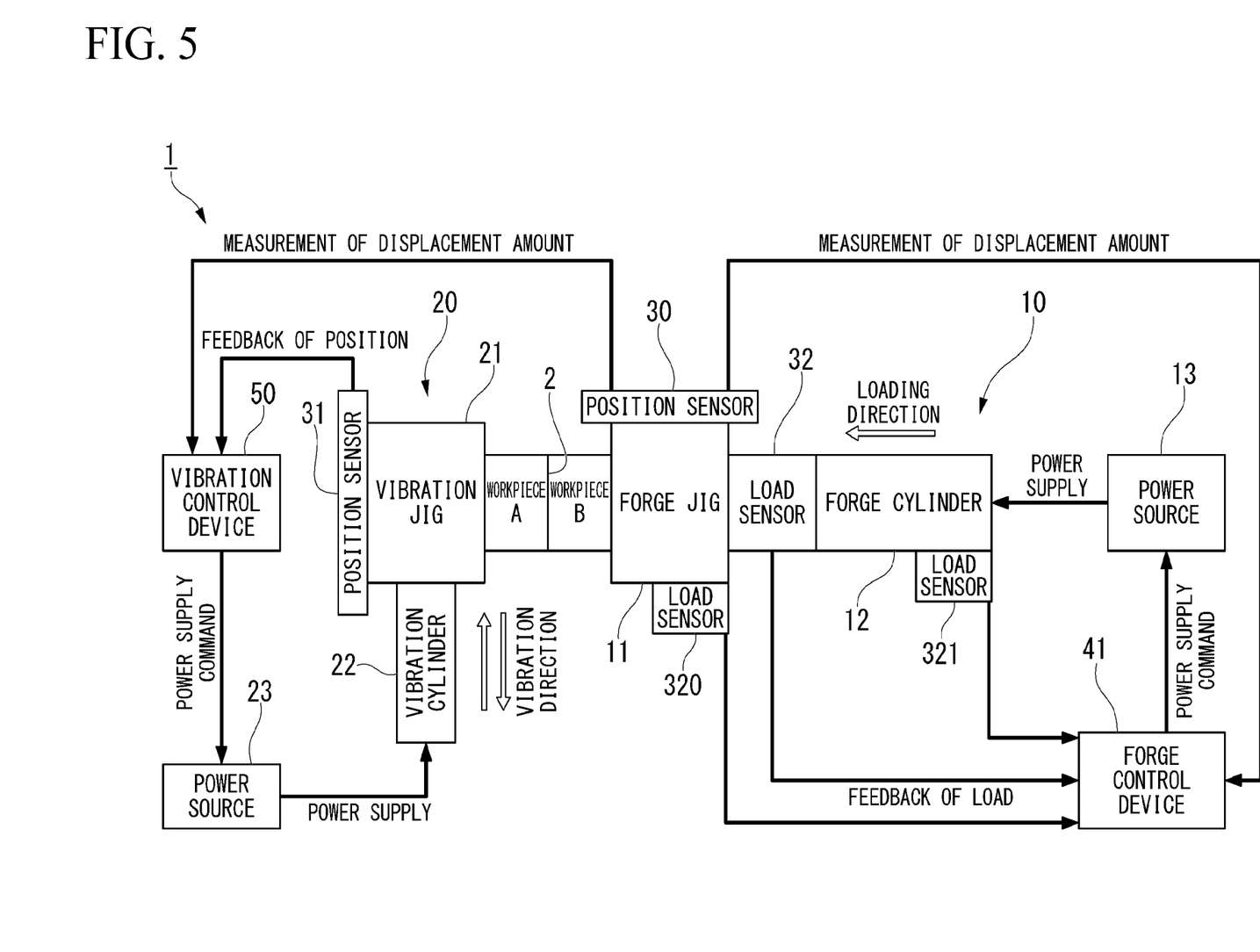
FIG. 5 is a block diagram showing a configuration of a linear friction-joining device according to the modification example of the present disclosure.

Here, the forge controller 40 may be a well-known computer including a CPU, a RAM, a ROM, and the like which can perform the control described above. Details of the control by the forge controller 40 may be defined by a software which can be arbitrarily changed or updated by a user. As shown in FIG. 1 or FIG. 5 to be described below, the forge controller 40 is electrically or electronically connected to the load sensors 32, 320, and 321 and the position sensor 30, and is electrically or electronically connected to the power source 13 so as to be able to transmit a signal (a power supply command) required for the forge controller 40 to control the power source 13 according to inputs of feedback of loads from the load sensors 32, 320, and 321 and a displacement amount measured by the position sensor 30.

The vibrator 20 includes a vibration jig 21, a vibration cylinder 22, and a power source 23 and vibrates the workpiece A relative to the workpiece B. The vibration jig 21 includes a chuck mechanism for holding the workpiece A, and is configured to be movable in a direction orthogonal to the pressing direction of the workpiece B. The vibration cylinder 22 is a hydraulic cylinder or the like, and vibrates the vibration jig 21. This vibration direction is a direction parallel to the bonding surface 2 of the workpiece A and the workpiece B, and is a direction orthogonal to the pressing direction (the loading direction) of the workpiece B.

Under control of the vibration controller 50, the power source 23 supplies a power (for example, hydraulic fluid) to the vibration cylinder 22. The power source 23 includes a servo valve or the like, and vibrates the vibration cylinder 22 at a high speed. According to a measurement result of the position sensors 30 and 31, the vibration controller 50 outputs a power supply command to the power source 23. The position sensor 31 measures a position of the vibration cylinder 22 in the vibration direction.

In the same manner as the forge controller 40, the vibration controller 50 may be a well-known computer including a CPU, a RAM, a ROM, and the like which can perform the control described above. Details of the control by the vibration controller 50 may be defined by a software which can be arbitrarily changed or updated by a user. As shown in FIG. 1 or FIG. 5 to be described below, the vibration controller 50 is electrically or electronically connected to the power source 23 so as to be able to transmit a signal (a power supply command) required for the vibration controller 50 to control the power source 23, according to inputs of a displacement amount and position feedback measured from the position sensors 30 and 31 which are electrically or electronically connected to the vibration controller 50.

After the forge controller 40 according to the present embodiment brings the workpiece B into contact with the workpiece A by a position control which depends on the measurement result of the position sensor 30, the forge controller 40 changes the position control to a load control which depends on the measurement result of the load sensor 32, and the forge controller 40 controls the forge cylinder 12 (the power source 13) so as to increase the pressing load toward a joining load. The forge controller 40 is the joining load reaching time adjuster which is configured to adjust the length of the joining load reaching time which is between the time when the position control is changed to the load control and the time when the pressing load reaches the joining load.

Hereinafter, a specific operation (a linear friction-joining method, hereinafter, referred to as the present method) of the linear friction-joining device 1 having the configuration described above will be described with reference to FIGS. 2 and 3.

Figure 2:
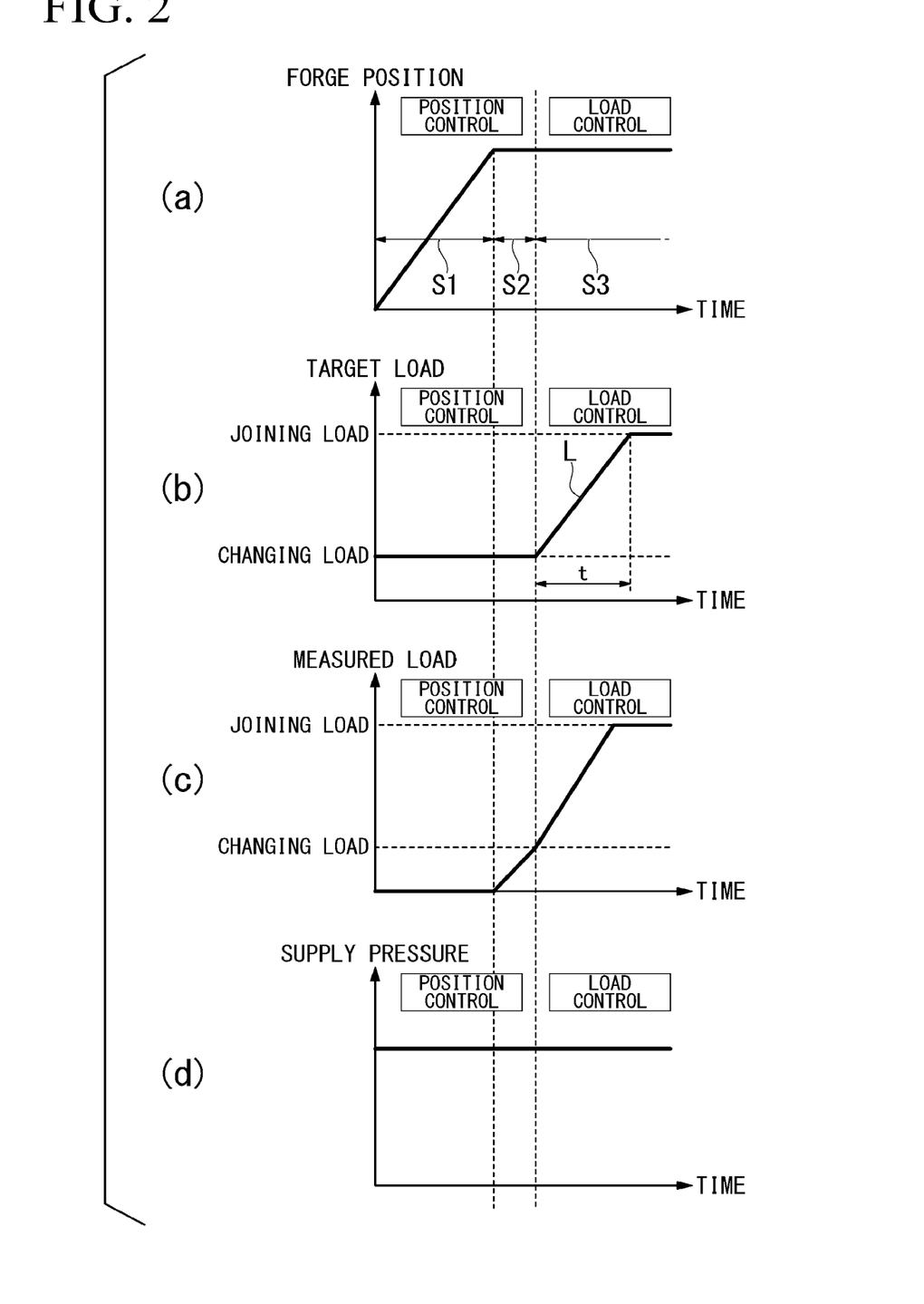
FIG. 2 is a time chart showing an operation of the linear friction joining device according to the embodiment of the present disclosure.
Figure 3:
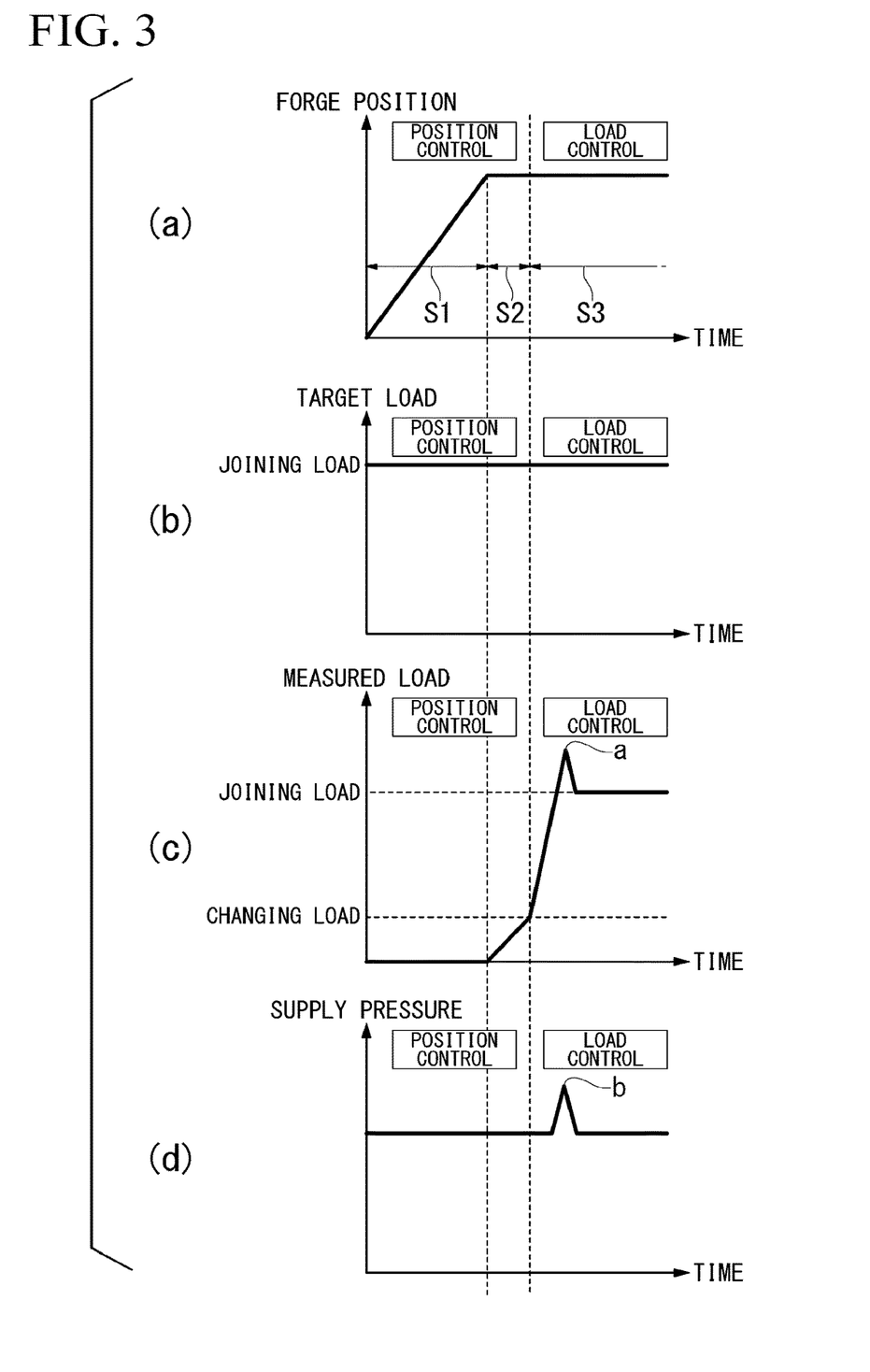
FIG. 3 is a time chart showing an operation of a linear friction-joining device in the related art as a comparative example.

FIG. 2 is a time chart showing an operation of the linear friction joining device 1 according to the embodiment of the present disclosure. FIG. 3 is a time chart showing an operation of the linear friction-joining device 1 in the related art as a comparative example.

"Forge position" shown in part (a) of FIG. 2 and part (a) of FIG. 3 corresponds to a measurement result of the position sensor 30. In addition, "target load" shown in part (b) of FIG. 2 and part (b) of FIG. 3 corresponds to a control command value of the forge controller 40. In addition, "measured load" shown in part (c) of FIG. 2 and part (c) of FIG. 3 corresponds to a measurement result of the load sensor 32. In addition, "supply pressure" shown in part (d) of FIG. 2 and part (d) of FIG. 3 corresponds to a measurement result of a pressure sensor (not shown) provided inside a path between the forge cylinder 12 and the power source 13.

Before a joining sequence of linear friction-joining, the workpieces A and B are separated from each other. In this state, the vibration controller 50 drives the vibration cylinder 22 for vibration at a preset normal vibration amplitude. Specifically, the vibration controller 50 compares a position target value (normal vibration amplitude) with position feedback measured by the position sensor 31, and sends a control command to the power source 23. When driving of the vibration device 20 is started, the forge controller 40 drives the forge cylinder 12 so as to move the workpiece B closer to the workpiece A at a constant speed by the position control which depends on a measurement result of the position sensor 30 (step S1).

When the workpiece B contacts with the workpiece A by the driving of the forge cylinder 12, as shown in part (c) of FIG. 2 and part (c) of FIG. 3, a load is caused by the contact (step S2). When feedback of the pressing load measured by the load sensor 32 reaches a preset changing load, the forge controller 40 changes the position control to the load control which depends on the measurement result of the load sensor 32 (step S3). Hereinbefore, the present method is the same as a method in the related art.

In the method in the related art shown in FIG. 3, as shown in part (b) of FIG. 3, a target load of load control is set to a joining load from the first. The joining load is a constant load (a frictional load) to be held at the time of friction in order to join the workpieces A and B. For this reason, immediately after changing to the load control, the forge controller 40 of the method in the related art drives the forge cylinder 12 for pressing by the joining load. Specifically, the forge controller 40 compares the joining load with feedback of the pressing load measured by the load sensor 32, and sends a power supply command to the power source 13.

Here, the workpiece B is mounted on the heavy forge jig 11 (for example, approximately 1 ton). In some cases, until the workpiece B collides with the workpiece A by constant speed movement of the position control and the load control reaches the target load (the joining load), an inertial force of the forge jig 11 is applied to the workpiece B. When the inertial force acting on the workpiece B at the time of the position control (constant speed movement) is overlapped with a sharp increase (controlled increase) of the pressing load at the time of the changing from the position control to the load control, as shown in part (c) of FIG. 3, the pressing load overshoots the joining load (indicated by a symbol a). In addition, when a flowing fluid abruptly stops due to a sudden stop of a displacement of the forge cylinder 12 at the time of the collision of the workpiece B and a pressure in a path rapidly increases due to an inertial force of the fluid, as shown in part (d) of FIG. 3, a surge pressure (indicated by a symbol b) occurs.

For this reason, as shown in part (b) of FIG. 2, the linear friction-joining device 1 according to the present embodiment includes the joining load reaching time adjuster (the forge controller 40) which adjusts the length of the joining load reaching time t which is between the time when the position control is changed to the load control and the time when the pressing load reaches the joining load. The forge controller 40 can set the joining load reaching time t as a control parameter. The joining load reaching time t is a reaching time from the changing load to the joining load, and the forge controller 40 is programmed such that a line L having a slope corresponding to the joining load reaching time t is automatically drawn between the changing load and the joining load if the joining load reaching time t is set.

Therefore, if the joining load reaching time t is largely set, the slope of a command value from the forge controller 40 becomes loose. Thus, since a deceleration time of the forge cylinder 12 becomes longer and a deceleration acceleration of the workpiece B becomes smaller, it is possible to reduce a negative influence due to the inertial force acting on the workpiece B. The presence or absence of the overshoot load is determined such that a log of the load sensor 32 is recorded and after a colliding test, it is checked whether a value larger than the joining load exists in the recorded log. In addition, regarding the surge pressure, in the same manner, the presence or absence of the surge pressure is determined according to a recorded log of the pressure sensor. When the overshoot load or the surge pressure exists, it is possible to set the most appropriate joining load reaching time t by increasing the joining load reaching time t and performing the test again.

Here, the recording in the log of the load sensor 32 indicates that loads measured by the load sensor 32 are stored in time series in parallel as data. In the same manner, the log of the pressure sensor is recorded.

In this manner, according to the present embodiment, the length of the joining load reaching time t which is between the time when the position control, which depends on the displacement amount of the workpiece B in the pressing direction, is changed to the load control, which depends on the pressing load of pressing the workpiece B onto the workpiece A, and the time when the pressing load reaches the joining load is adjusted. For this reason, it is possible to prevent a sharp increase of the pressing load by managing the joining load reaching time t such that the inertial force acting on the workpiece B is not overlapped with the increase of the pressing load by the control when the inertial force acting on the workpiece B collides the workpiece A. Therefore, in the present embodiment, it is possible to prevent the overshooting of the pressing load and the occurrence of the surge pressure due to an inertial force when the workpieces A and B collide with each other.

The subsequent linear friction-joining process proceeds as follows. First, when a joining process of the workpieces A and B proceeds by the load control, a burr is discharged in a side direction (a vibration direction) of both of the workpieces A and B and a workpiece length in the pressing direction is reduced (so-called burn-off). When a burn-off amount reaches a predetermined threshold value, the vibration controller 50 controls the vibration device 20 so as to stop vibration of the workpiece A. When the vibration of the workpiece A is stopped, the forge controller 40 drives the forge cylinder 12 for pressing by a load larger than the joining load. The load is a load (a forge load) for stabilizing joining of both of the workpieces A and B after the friction of the workpieces A and B.

After pressing the workpieces A and B for a predetermined time, the forge controller 40 stops the pressing by the forge cylinder 12. Specifically, the forge controller 40 outputs a control command so as to stop the power supply from the power source 13 to the forge cylinder 12 and stops the driving of the forge cylinder 12.

As described above, the linear friction-joining process by the linear friction-joining device 1 is terminated.

In this manner, the present embodiment described above discloses the linear friction-joining device 1 including the forge cylinder 12 which presses the workpiece B onto the workpiece A and the vibration cylinder 22 which vibrates the workpiece A relative to the workpiece B. The linear friction-joining device 1 includes the position sensor 30 which measures the displacement amount of the workpiece B in the pressing direction, the load sensor 32 which measures the pressing load of the workpiece B pressed onto the workpiece A, and the forge controller 40 which brings the workpiece B into contact with the workpiece A by the position control which depends on the measurement result of the position sensor 30, changes the position control to the load control which depends on the measurement result of the load sensor 32, and increases the pressing load toward the joining load. Further, the linear friction-joining device 1 includes the joining load reaching time adjuster which adjusts a length of the joining load reaching time t which is between the time when the position control is changed to the load control and the time when the pressing load reaches the joining load. By adopting this configuration, it is possible to prevent the overshooting of the pressing load and the occurrence of the surge pressure due to an inertial force when the workpieces A and B collide with each other.

Although the embodiment of the present disclosure is described with reference to the accompanying drawings, the present disclosure is not limited to the embodiment. Various shapes and combinations or the like of the components described in the embodiment are merely examples, and various modifications can be made according to a design requirement or the like within the scope of the present disclosure described in the claims.

For example, a forge controller 41 (a controller) shown in FIG. 5 according to the first modification example of the present disclosure may be a joining load reaching time adjuster which is configured to adjust a length of the joining load reaching time t according to magnitude of the inertial force acting on the workpiece B during position control. The magnitude of the inertial force acting on the workpiece B during the position control depends on weights of the workpiece B and the forge jig 11. For example, there is a case where the weight of the forge jig 11 is constant and the weight of the workpiece B is able to be changed due to a target of the linear friction-joining. In this case, by providing the torque jig 11 with the second load sensor 320 which measures a weight of the workpiece B loaded onto the forge jig 11, the forge jig 11 may be programmed so as to automatically adjust the length of the joining load reaching time t according to a measurement result of the second load sensor 320. In addition, since the magnitude of the inertial force acting on the workpiece B depends on a deceleration acceleration from constant speed movement to a zero speed during the position control, the forge controller 41 may be a joining load reaching time adjuster which is configured to adjust the length of the joining load reaching time t according to a speed during the position control. In this case, for example, according to a measurement result of the position sensor 30, the forge controller 41 may calculate a speed of the workpiece B. In a case where the weight of the forge jig 11 changes as a result of replacing the forge jig 11 according to a shape of the workpiece B, for example, the joining load reaching time adjuster may be configured such that the weight of the forge jig 11 is measured by providing the third load sensor 321 in the forge cylinder 12 and the forge controller 41 adjusts the length of the joining load reaching time t according to a measurement result of the third load sensor 321.

A forge controller 42 (a controller) shown in FIG. 1 according to the second modification example of the present disclosure may be a joining load reaching time adjuster which is configured to set a target load, which is lower than the joining load, before setting the joining load during the load control and to gradually increase the pressing load toward the joining load. That is, the line L having a slope according to the joining load reaching time t shown in part (b) of FIG. 2 may be programmed so as to have a stepwise shape. With this configuration, since the load is controlled to be pressed with the target load lower than the joining load immediately after the position control is changed to the load control, it is possible to prevent a sharp increase of the pressing load immediately after the changing. Therefore, in the present embodiment, it is possible to prevent the overshooting of the pressing load and the occurrence of the surge pressure due to an inertial force when the workpieces A and B collide with each other.

A forge controller 43 (a controller) shown in FIG. 1 according to the third modification example of the present disclosure may be a joining load reaching time adjuster configured to gradually increase an increasing speed per unit time of the pressing load during the load control. That is, the line L having a slope according to the joining load reaching time t shown in part (b) of FIG. 2 may be programmed so as to be a quadric function, a sine curve, an algebraic function, a cubic function, or the like. With this configuration, since the pressing load hardly increases immediately after the position control is changed to the load control and after then, an increasing speed of the pressing load gradually increases, it is possible to prevent a sharp increase of the pressing load immediately after the changing. Therefore, in the present embodiment, it is possible to prevent the overshooting of the pressing load and the occurrence of the surge pressure due to an inertial force when the workpieces A and B collide with each other.

Figure 4:
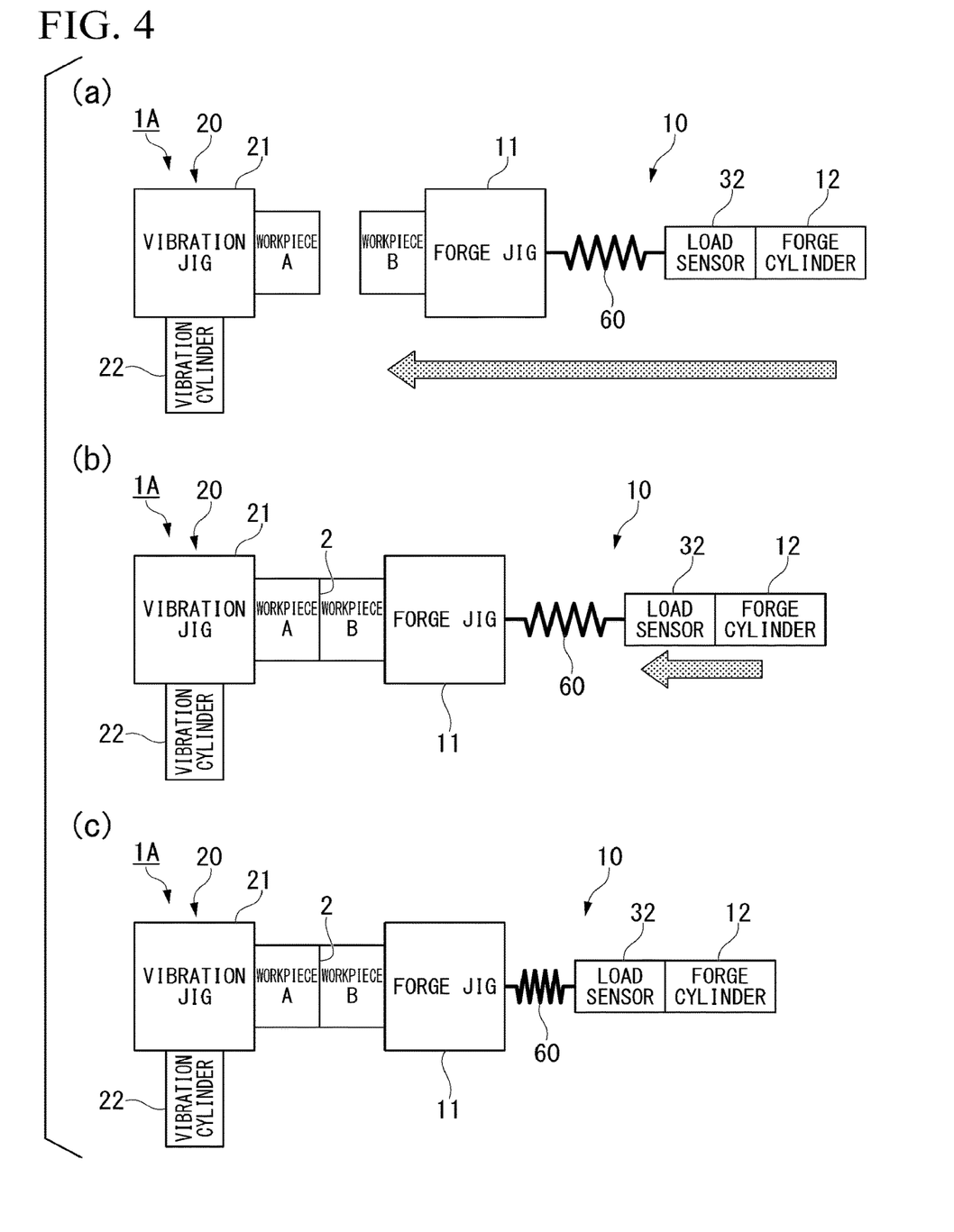
FIG. 4 is a block diagram showing a configuration of a linear friction-joining device according to a modification example of the embodiment of the present disclosure.

As in the fourth modification example of the present disclosure shown in FIG. 4, the joining load reaching time adjuster may be mechanically configured. FIG. 4 is a block diagram showing a configuration of a linear friction joining device 1A according to the fourth modification example of the present disclosure. As shown in FIG. 4, the forge device 10 includes the forge jig 11 on which the workpiece B is loaded and the forge cylinder 12 which moves the forge jig 11. The joining load reaching time adjuster is a spring member 60 interposed between the forge jig 11 and the forge cylinder 12. Part (a) of FIG. 4 shows the position control, part (b) of FIG. 4 shows the workpieces A and B being contacted with each other, and part (c) of FIG. 4 shows the load control. Since the pressing load can be gradually increased by interposing the spring member 60 between the forge jig 11 and the forge cylinder 12, it is possible to prevent a sharp increase of the pressing load immediately after the position control is changed to the load control. Therefore, in the embodiment, even by using the method in the related art shown in FIG. 3, it is possible to mechanically prevent the overshooting of the pressing load and the occurrence of the surge pressure due to an inertial force when the workpieces A and B collide with each other. That is, the joining load reaching time adjuster according to the present disclosure may have another configuration different from the forge controllers 40, 41, 42, and 43.

Since FIG. 4 is a diagram for displaying only a difference from FIG. 1, the forge controller 40 and the power source 13 included in the forge device 10, the vibration controller 50, the power source 23, and the position sensor 31 included in the vibration device 20, and the position sensor 30 provided in the forge jig shown in FIG. 1 are omitted.

That is, in the fourth modification example, after the forge controller 40 brings the workpiece B into contact with the workpiece A by position control which depends on the measurement result of the position sensor 30, the forge controller 40 changes the position control to the load control which depends on the measurement result of the load sensor 32, and the forge controller 40 controls the forge cylinder 12 (the power source 13) so as to increase the pressing load toward a joining load. In addition, in the fourth modification example, the joining load reaching time adjuster is the spring member 60.

Further, for example, in the embodiment and the modification example described above, the configuration in which the workpiece B is pressed onto the workpiece A and the workpiece A is vibrated relative to the workpiece B is an exemplary example, but the workpiece A may be fixed and the workpiece B may be pressed and vibrated onto the workpiece A, for example.

In addition, for example, the present disclosure is not limited to a case of linear friction-joining a disk of a rotor blade or a stator vane and a blade, and can be widely applied to the case of friction-joining the workpiece A and the workpiece B.

INDUSTRIAL APPLICABILITY

According to the present disclosure, in a linear friction-joining device, it is possible to prevent overshooting of a pressing load and occurrence of surge pressure due to an inertial force when workpieces collide with each other.

REFERENCE SIGNS LIST

1, 1A linear friction-joining device
11 forge jig (jig)
12 forge cylinder (cylinder device)
30, 31 position sensor
32, 320, 321 load sensor
40, 41, 42, 43 forge controller (controller, joining load reaching time adjuster)
60 spring member (joining load reaching time adjuster)
A workpiece (first member)
B workpiece (second member)
t joining load reaching time

The invention claimed is:
1. A linear friction-joining device comprising:
a pressing device for pressing a second member onto a first member in a pressing direction;
a vibrator for relatively vibrating the first member and the second member;
a position sensor configured to measure a displacement amount of the second member in the pressing direction;
a load sensor configured to measure a pressing load of the second member pressed onto the first member;
a controller configured to bring the second member into contact with the first member by a position control, which depends on a measurement result of the position sensor, to change the position control to a load control, which depends on a measurement result of the load sensor, and to increase the pressing load toward a joining load; and
a joining load reaching time adjuster configured to adjust a length of a joining load reaching time which is between a time when the position control is changed to the load control and a time when the pressing load reaches the joining load,
wherein the joining load reaching time adjuster is configured to adjust the length of the joining load reaching time according to a magnitude of an inertial force acting on the second member during the position control.
2. The linear friction-joining device according to claim 1, wherein the joining load reaching time adjuster is the controller which is configured to set a target load, which is lower than the joining load, before reaching the joining load and to gradually increase the pressing load toward the joining load during the load control.
3. The linear friction-joining device according to claim 1, wherein the joining load reaching time adjuster is the controller which is configured to gradually increase an increasing speed per unit time of the pressing load during the load control.
4. The linear friction-joining device according to claim 1, wherein the pressing device includes a jig on which the second member is loaded and a cylinder device which moves the jig, and
the joining load reaching time adjuster is a spring member interposed between the jig and the cylinder device.
5. The linear friction-joining device according to claim 1, wherein the joining load reaching time adjuster is the controller which is configured to set a target load, which is lower than the joining load, before reaching the joining load and to gradually increase the pressing load toward the joining load during the load control.
6. The linear friction-joining device according to claim 1, wherein the joining load reaching time adjuster is the controller which is configured to gradually increase an increasing speed per unit time of the pressing load during the load control.

* * * * *